United States Patent
Vilaipornsawai et al.

(10) Patent No.: US 11,297,632 B2
(45) Date of Patent: Apr. 5, 2022

(54) METHODS AND APPARATUS FOR ULTRA-RELIABLE LOW LATENCY COMMUNICATION (URLLC) DURING MEASUREMENT GAP

(71) Applicant: HUAWEI TECHNOLOGIES CO., LTD., Guangdong (CN)

(72) Inventors: Usa Vilaipornsawai, Nepean (CA); Mohammadhadi Baligh, Ottawa (CA); Yongxia Lyu, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/437,159

(22) Filed: Jun. 11, 2019

(65) Prior Publication Data

US 2020/0015246 A1    Jan. 9, 2020

Related U.S. Application Data

(60) Provisional application No. 62/694,707, filed on Jul. 6, 2018.

(51) Int. Cl.
*H04W 72/12* (2009.01)
*H04W 24/10* (2009.01)
(Continued)

(52) U.S. Cl.
CPC ...... *H04W 72/1231* (2013.01); *H04B 17/318* (2015.01); *H04L 1/0026* (2013.01);
(Continued)

(58) Field of Classification Search
None
See application file for complete search history.

(56) References Cited

U.S. PATENT DOCUMENTS

2013/0155881 A1    6/2013    Amerga et al.
2014/0071919 A1    3/2014    Kitazoe et al.
(Continued)

FOREIGN PATENT DOCUMENTS

CN    103999491 A    8/2014

OTHER PUBLICATIONS

3GPP TS 36.133, V9.16.0, "3rd Generation Partnership Project; Technical Specification Group Radio Access Network; Evolved Universal Terrestrial Radio Access (E-UTRA); Requirements for support of radio resource management (Release 9)", Jun. 2013, 523 pages.

(Continued)

*Primary Examiner* — Chi H Pham
*Assistant Examiner* — Raul Rivas

(57) ABSTRACT

The present disclosure relates to handling latency-sensitive traffic, in Ultra-Reliable Low Latency Communication (URLLC) for example, during measurement gaps. Latency-sensitive traffic is detected at a user equipment (UE), and transmission or reception associated with the latency-sensitive traffic is performed at the UE during a time period in which a measurement gap has been configured for the UE to perform measurement of received signal strength. The transmission or reception may be performed instead of or in addition to the measurement. Other embodiments that involve shortening measuring times and shortening or avoiding switching times associated with communication resource switching, for example, are also disclosed.

29 Claims, 4 Drawing Sheets

(51) Int. Cl.
*H04B 17/318* (2015.01)
*H04L 5/00* (2006.01)
*H04W 72/04* (2009.01)
*H04L 1/00* (2006.01)
*H04L 25/02* (2006.01)
*H04W 76/11* (2018.01)

(52) U.S. Cl.
CPC .......... *H04L 5/005* (2013.01); *H04L 25/0226* (2013.01); *H04W 24/10* (2013.01); *H04W 72/042* (2013.01); *H04W 76/11* (2018.02)

(56) References Cited

U.S. PATENT DOCUMENTS

| | | | |
|---|---|---|---|
| 2014/0200002 | A1 | 7/2014 | Vangala et al. |
| 2016/0095039 | A1* | 3/2016 | Valliappan ............ H04W 36/14 370/332 |
| 2016/0219088 | A1* | 7/2016 | Ma ...................... H04L 65/4069 |
| 2017/0111233 | A1* | 4/2017 | Kokkula ............. H04L 41/0823 |
| 2017/0127397 | A1 | 5/2017 | Hahn et al. |
| 2017/0295511 | A1* | 10/2017 | Sebire ............... H04W 74/0833 |
| 2019/0173553 | A1* | 6/2019 | Park ...................... H04L 5/0048 |
| 2019/0182734 | A1* | 6/2019 | Laliberte ............... H04L 65/105 |
| 2020/0067678 | A1* | 2/2020 | Zhou ..................... H04L 5/0055 |

OTHER PUBLICATIONS

3GPP TS 38.133 V15.3.0, "5G; NR; Requirements for support of radio resource management", ETSI Technical Specification 138 133 V15.3.0, (Release 15), Oct. 2018, 134 pages.

3GPP TS 38.321 V15.2.0, "3rd Generation Partnership Project; Technical Specification Group Radio Access Network; NR; Medium Access Control (MAC) protocol specification(Release 15)", Jun. 2018, 73 pages.

3GPP TS 38.331 V15.2.1, "3rd Generation Partnership Project; Technical Specification Group Radio Access Network; NR; Radio Resource Control (RRC) protocol specification (Release 15)", Jun. 2018, 303 pages.

Huawei et al., "On handling of URLLC traffic during measurement gaps in uplink", 3GPP TSG-RAN WG2 102 Draft, R2-1807456, May 21-25, 2018, Busan, Korea, XP051443840, 3 pages.

Ericsson, "On Measurement Gaps for URLLC", 3GPP TSG-RAN WG2 AH 1807 Draft; R2-1810066, Jul. 2-6, 2018, Montreal, Canada, XP051467295, 3 pages.

* cited by examiner

METHODS AND APPARATUS FOR ULTRA-RELIABLE LOW LATENCY COMMUNICATION (URLLC) DURING MEASUREMENT GAP

CROSS-REFERENCE TO RELATED APPLICATION

The present application claims the benefit of U.S. Provisional Application No. 62/694,707, entitled "METHODS AND APPARATUS FOR ULTRA-RELIABLE LOW LATENCY COMMUNICATION (URLLC) DURING MEASUREMENT GAP", filed on Jul. 6, 2018, the entire contents of which are incorporated herein by reference.

FIELD

The present disclosure relates to generally to communications and, in particular, to Ultra-Reliable Low Latency Communication (URLLC) during a measurement gap.

BACKGROUND

In fifth generation (5G) New Radio (NR), different devices and services are expected to have different requirements for wireless communication. For example, some devices may require low-latency communication (less than 0.5 ms round trip, for example) with high reliability (less than $10^{-5}$ block error rate (BLER), for example). These devices are proposed to communicate in a framework sometimes known as ultra-reliable low-latency communication (URLLC). URLLC may be unpredictable and sporadic in nature, and may not require a high data rate depending on the application. URLLC may be used in either uplink (UL) or downlink (DL), and may be particularly applicable in cases such as vehicle-to-vehicle (V2V) communication for coordinating automobile traffic.

In 5G NR Release 15 (R15), Measurement gaps (MGs) are defined as periods that a User Equipment (UE) may use to perform measurements, with no uplink (UL) or downlink (DL) transmissions being scheduled (according to TS38.331), with a few limited exceptions. These exceptions include "Message 3" random access channel signaling, as well as monitoring of a Physical Downlink Control Channel (PDCCH) if ra-Response Window or ra-ContentionResolutionTimer is running (according to TS38.321: Handling of measurement gaps). Measurements during an MG are for Radio Resource Management (RRM), and involve measurement of signal strength, such as reference signal received power (RSRP) from neighbor cells.

In TS38.133, the duration of an MG, also referred to as measurement gap length (MGL), is at least 3 ms for Frequency Range (FR)1 and at least 1.5 ms for FR2. Switching times associated with communication resource switching, such as bandwidth part (BWP) switching within a serving cell, for example, could also introduce a delay of between 0.4-2 ms.

Such MGs and/or switching times can introduce challenges in satisfying URLLC latency requirements, particularly when the MG is longer than the URLLC latency constraint.

SUMMARY

According to one aspect of the present disclosure, a method includes: detecting latency-sensitive traffic at a user equipment (UE); and performing, at the UE, transmission or reception associated with the latency-sensitive traffic during a time period in which a measurement gap has been configured for the UE to perform the measurement of received signal strength. The transmission or reception associated with the latency-sensitive traffic could be performed instead of or in addition to measurement of received signal strength.

In an embodiment, the method also includes performing the measurement during a remainder of the measurement gap after the transmission or reception is completed.

In an embodiment, the measurement gap includes a measuring time, and the method also includes shortening the measuring time.

In an embodiment, the measurement gap includes a switching time associated with communication resource switching.

In an embodiment, the method also includes shortening the switching time.

In an embodiment, the method also includes configuring communication resources to avoid the communication resource switching.

In an embodiment, the performing involves performing the transmission or reception in addition to the measurement during the measurement gap using a first subset of antennas of the UE for the transmission or reception, and using a second subset of the antennas, different from the first subset of antennas, for the measurement.

In an embodiment, method also includes determining the first subset of antennas and the second subset of antennas based on quality of communication links associated with the antennas of the UE.

In an embodiment, using the first subset of antennas includes one or more of: using for the first subset a lower Modulation and Coding Scheme (MCS) relative to an MCS for all of the antennas of the UE; using for the first subset a first precoder that is different from a second precoder used for the second subset; and using for the first subset first filtering coefficients that are different from second filtering coefficients used for the second subset.

In an embodiment, the latency-sensitive traffic includes Ultra-Reliable Low Latency Communication (URLLC) traffic.

In an embodiment, the detecting includes physical layer-based detection.

For example, in an embodiment the detecting includes identifying the latency-sensitive traffic based on one or more of: a Radio Network Temporary Identifier (RNTI); occurrence of multiple Physical Downlink Control Channel (PDCCH) monitoring occasions in a slot; a compact Downlink Control Information (DCI); one or more other indication(s) via signaling.

In an embodiment, the detecting includes detection based on a logical configuration.

In an embodiment, the detecting includes identifying the latency-sensitive traffic based on a logical channel number.

In an embodiment, performing transmission or reception includes any one or more of: uplink transmission and downlink reception.

In an embodiment, the uplink transmission includes transmitting one or more of: a scheduling request; an acknowledgement of downlink reception; uplink data; and control information that is related to the latency-sensitive traffic.

In an embodiment, the downlink reception includes one or more of: monitoring for control information that is related to the latency-sensitive traffic; receiving Channel State Information (CSI) Reference Signal (RS), also referred to as CSI-RS signals; and receiving downlink data.

In an embodiment, a method also includes transmitting any one or more of the following during the time period: periodic, aperiodic, and/or semi-persistent Channel State Information (CSI) reports; and Sounding Reference Signals.

In an embodiment, the measurement gap is longer than a delay constraint of the latency-sensitive traffic.

In an embodiment, the measurement gap includes a measuring time, and the measuring time is longer than a delay constraint of the latency-sensitive traffic.

In an embodiment, the measurement gap includes a switching time, and the switching time is longer than a delay constraint of the latency-sensitive traffic.

According to another aspect, a non-transitory processor-readable medium stores instructions which, when executed by one or more processors, cause the one or more processors to perform a method as disclosed herein. For example, in an embodiment the instructions when executed cause the one or more processors to perform a method that includes detecting latency-sensitive traffic at a UE; and performing, at the UE, transmission or reception associated with the latency-sensitive traffic during a time period in which a measurement gap has been configured for the UE to perform measurement of received signal strength. Other method features disclosed herein are also applicable to embodiments that are implemented using a non-transitory processor-readable medium.

According to another aspect, a user equipment (UE) includes: a processor; and a non-transitory computer readable storage medium storing instructions for execution by the processor, the instructions causing the processor to perform a method as disclosed herein.

According to another aspect, a user equipment (UE) includes: a processor; and a non-transitory computer readable storage medium storing instructions for execution by the processor, the instructions causing the processor to perform a method that includes: detecting latency-sensitive traffic; and performing transmission or reception associated with the latency-sensitive traffic during a time period in which a measurement gap has been configured for the UE to perform the measurement of received signal strength. The transmission or reception associated with the latency-sensitive traffic could be performed instead of or in addition to measurement of received signal strength.

In an embodiment, the instructions further cause the processor to: perform the measurement during a remainder of the measurement gap after the transmission or reception is completed.

In an embodiment, the measurement gap includes a measuring time, and the instructions further cause the processor to: shorten the measuring time.

In an embodiment, the measurement gap includes a switching time associated with communication resource switching.

In an embodiment, the instructions further cause the processor to: shorten the switching time.

In an embodiment, the instructions further cause the processor to: configure communication resources to avoid the communication resource switching.

In an embodiment, the UE also includes antennas, and the performing includes performing the transmission or reception in addition to the measurement during the measurement gap using a first subset of the antennas for the transmission or reception, and using a second subset of the antennas, different from the first subset of the antennas, for the measurement.

In an embodiment, the instructions further cause the processor to: determine the first subset of the antennas and the second subset of the antennas based on quality of communication links associated with the antennas.

In an embodiment, using the first subset of antennas includes one or more of: using for the first subset a lower Modulation and Coding Scheme (MCS) relative to an MCS for all of the antennas of the UE; using for the first subset a first precoder that is different from a second precoder used for the second subset; and using for the first subset first filtering coefficients that are different from second filtering coefficients used for the second subset.

In an embodiment, the latency-sensitive traffic includes URLLC traffic.

In an embodiment, the detecting includes physical layer-based detection.

In an embodiment, the detecting includes identifying the latency-sensitive traffic based on one or more of: an RNTI; occurrence of multiple PDCCH monitoring occasions in a slot; a compact DCI; and one or more other indication(s) via signaling.

In an embodiment, the detecting includes detection based on a logical configuration.

In an embodiment, the detecting includes identifying the latency-sensitive traffic based on a logical channel number.

In an embodiment, the transmission or reception includes any one or more of: uplink transmission and downlink reception.

In an embodiment, the uplink transmission includes transmitting one or more of: a scheduling request; an acknowledgement of downlink reception; uplink data; and control information that is related to the latency-sensitive traffic.

In an embodiment, the downlink reception includes one or more of: monitoring for control information that is related to the latency-sensitive traffic; receiving CSI-RS signals; and receiving downlink data.

In an embodiment, the instructions further cause the processor to: transmit any one or more of the following during the time period: periodic, aperiodic, and/or semi-persistent Channel State Information (CSI) reports; and Sounding Reference Signals.

In an embodiment, the measurement gap is longer than a delay constraint of the latency-sensitive traffic.

In an embodiment, the measurement gap includes a measuring time, and the measuring time is longer than a delay constraint of the latency-sensitive traffic.

In an embodiment, the measurement gap includes a measuring time, and wherein the measuring time is longer than a delay constraint of the latency-sensitive traffic These and other illustrative embodiments are disclosed by way of example in the description, claims, and/or drawings.

Other aspects and features of embodiments of the present disclosure will become apparent to those ordinarily skilled in the art upon review of the following description.

BRIEF DESCRIPTION OF THE DRAWINGS

Examples of embodiments of the invention will now be described in greater detail with reference to the accompanying drawings.

DETAILED DESCRIPTION

Figure 1:
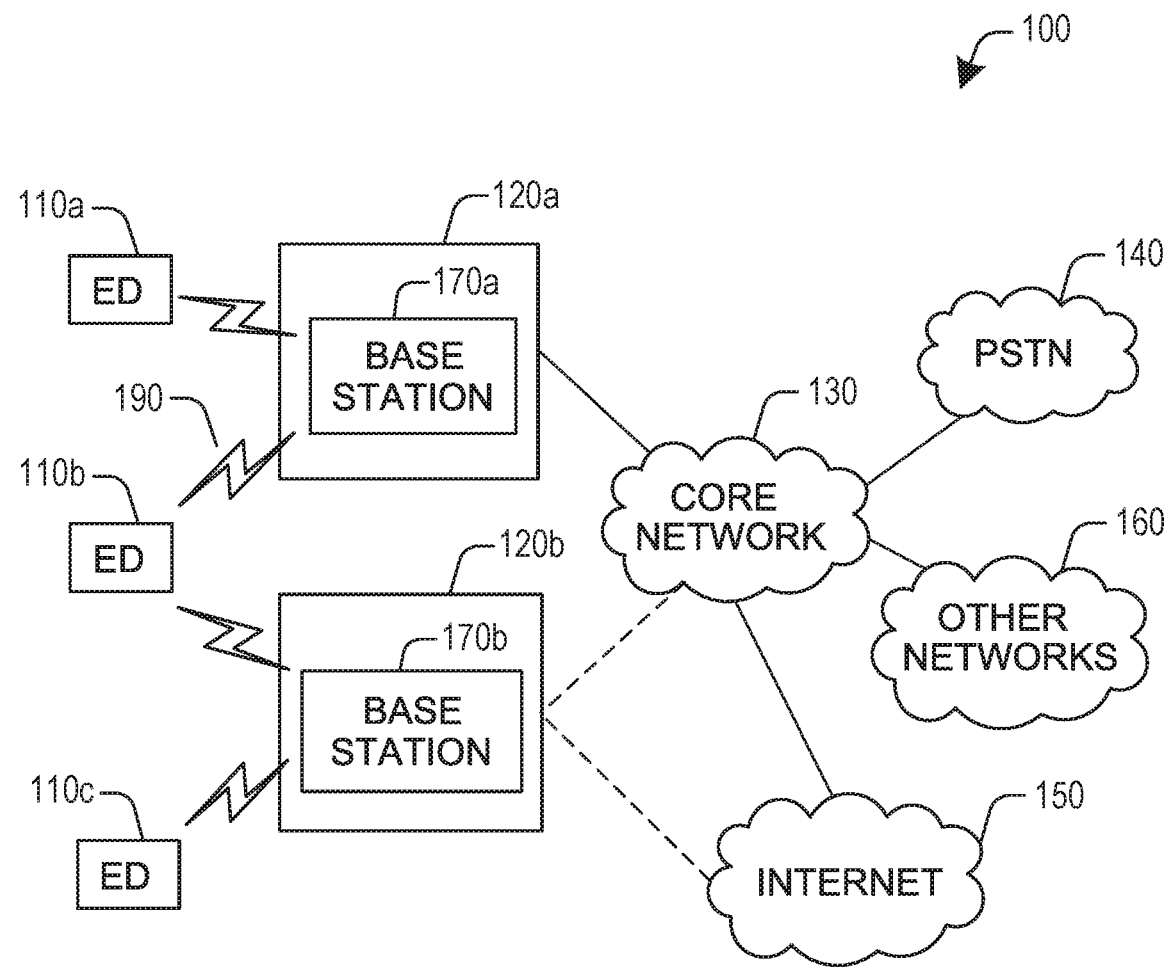
FIG. 1 is a network diagram of an example communication system.

FIG. 1 illustrates an example communication system 100 in which embodiments of the present disclosure could be implemented. In general, the communication system 100 enables multiple wireless or wired elements to communicate data and other content. The purpose of the communication system 100 may be to provide content (voice, data, video, text) via broadcast, narrowcast, user device to user device, etc. The communication system 100 may operate by sharing resources such as bandwidth.

In this example, the communication system 100 includes electronic devices (EDs) 110a-110c, radio access networks (RANs) 120a-120b, a core network 130, a public switched telephone network (PSTN) 140, the internet 150, and other networks 160. Although certain numbers of these components or elements are shown in FIG. 1, any reasonable number of these components or elements may be included in the communication system 100.

The EDs 110a-110c are configured to operate, communicate, or both, in the communication system 100. For example, the EDs 110a-110c are configured to transmit, receive, or both, via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission point (TP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of these components. The communication system 100 may include RANs, such as RAN 120b, wherein the corresponding base station 170b accesses the core network 130 via the internet 150, as shown by a dashed line.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices.

Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments the radio access technology supports pico or femto cells. In some embodiments, multiple transceivers could be used for each cell, for example using multiple-input multiple-output (MIMO) technology. The number of RANs 120a-120b shown is only an example. Any number of RANs may be contemplated when devising the communication system 100.

The base stations 170a-170b communicate with one or more of the EDs 110a-110c over one or more air interfaces 190 using wireless communication links, such as radio frequency (RF) links, microwave links, and/or infrared (IR) links, etc. The air interfaces 190 may utilize any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as HSPA, HSPA+ optionally including HSDPA, HSUPA or both. Alternatively, a base station 170a-170b may establish an air interface 190 with Evolved UMTS Terrestrial Radio Access (E-UTRA) using LTE, LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and/or other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160). In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as IP, TCP, UDP. EDs 110a-110c may be multimode devices capable of operation according to multiple radio access technologies, and incorporate multiple transceivers necessary to support such operation.

Figure 2:
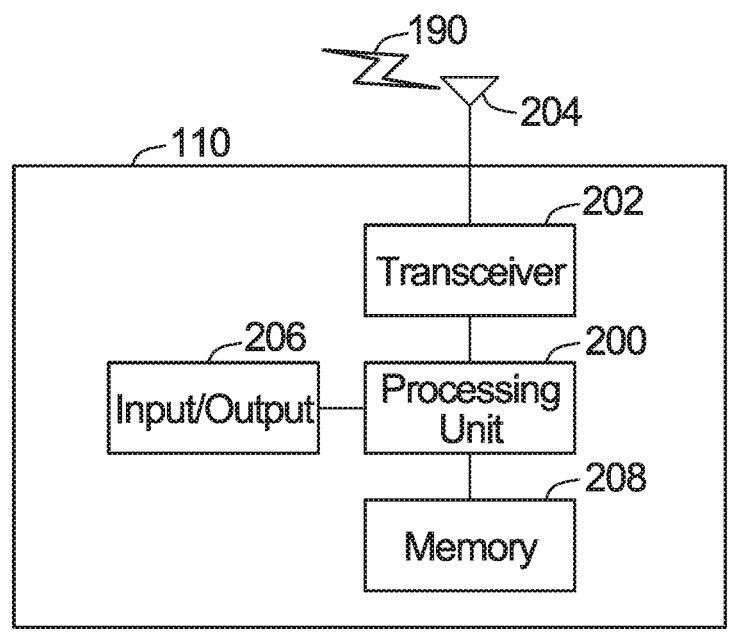
FIG. 2 is a block diagram of an example electronic device.
Figure 3:
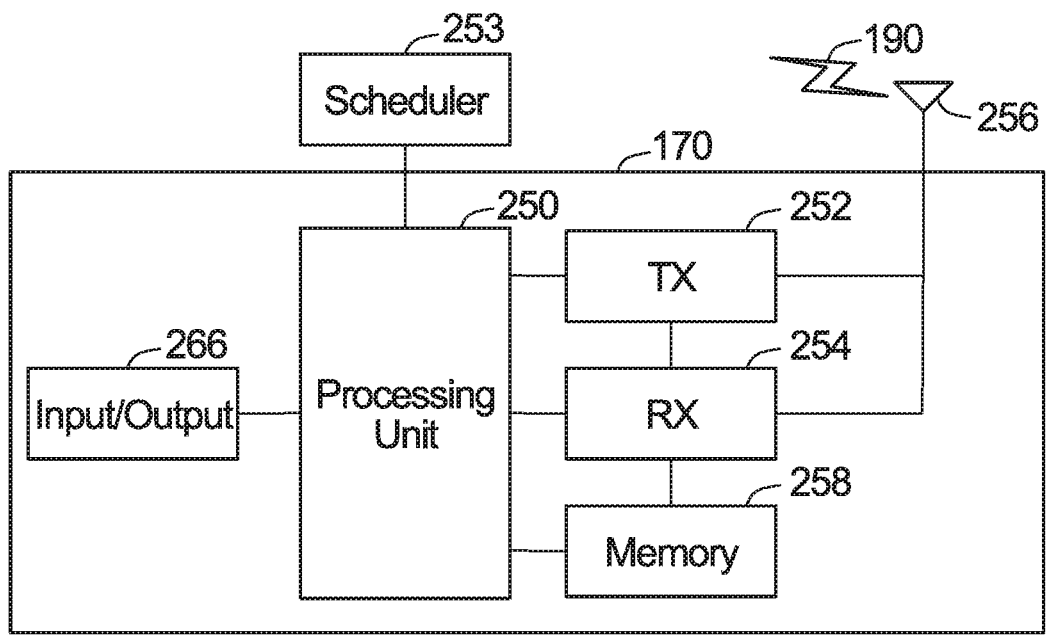
FIG. 3 is a block diagram of another example electronic device.

FIGS. 2 and 3 illustrate example devices that may implement the methods and teachings according to this disclosure. In particular, FIG. 2 illustrates an example ED 110, and FIG. 3 illustrates an example base station 170. These components could be used in the communication system 100 or in any other suitable system.

As shown in FIG. 2, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail herein. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described herein and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 3, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail herein. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described herein and that are executed by the processing unit(s) 250.

Each input/output device 266 permits interaction with a user or other devices in the network. Each input/output device 266 includes any suitable structure for providing information to or receiving/providing information from a user, including network interface communications.

A UE such as an ED 110 could be configured to operate as disclosed herein, to potentially satisfy URLLC latency requirements even if other operations such as taking measurements during a measurement gap and/or communication resource switching are to be performed. A measurement gap precludes traffic handling by a UE, or at least by UE components that are involved in taking measurements, and a UE is also unable to perform traffic handling operations such as transmission and reception during communication resource switching, such as Bandwidth Part (BWP) switching. A BWP represents an example of communication resources, and includes of a group of contiguous Physical Resource Blocks (PRBs). BWP switching represents an example of communication resource switching. Different BWPs could have the same or different bandwidths, center frequencies, subcarrier spacings, and/or other configuration parameters. BWP switching times could be dependent upon how different the configurations are between BWPs that are being switched.

Several approaches that are intended to be useful in satisfying URLLC latency requirements are proposed and described in detail herein. In some embodiments, for example, UE behaviors are defined to prioritize URLLC traffic over MGs and/or BWP switching.

Regarding MGs, configuration parameters could include the following:

Gap Offset ranges from 0, . . . 159 (i.e. 0, . . . , MGRP−1)

Measurement Gap Length (MGL) in ms {1.5, 3, 3.5, 4, 5.5, 6}, and/or others in accordance with the present disclosure, such as any one or more of {0.35, 0.4, 0.45, 0.55, 0.6, 0.65, 0.75, 0.8}

Measurement Gap Repetition Period (MGRP) in ms {20, 40, 80, 160}

Measurement Gap Timing Advance in ms {0, 0.25, 0.5}.

TS38.331 provides the following definitions:

gapOffset: Value gapOffset is the gap offset of the gap pattern with MGRP indicated in the field mgrp—the value range should be from 0 to mgrp-1.

MGL: Value mg1 is the measurement gap length in ms of the measurement gap—the applicability of the measurement gap is according Table 9.1.2-1 and Table 9.1.2-2 in TS 38.133. Value ms1dot5 corresponds to 1.5 ms, ms3 corresponds to 3 ms and so on.

MGRP: Value mgrp is measurement gap repetition period in ms of the measurement gap. The applicability of the measurement gap is according to in Table 9.1.2-1 and Table 9.1.2-2 in TS 38.133.

MGTA: Value mgta is the measurement gap timing advance in ms. The applicability of the measurement gap timing advance is according to section 9.1.2 of TS 38.133. Value ms0 corresponds to 0 ms, ms0dot25 corresponds to 0.25 ms and ms0dot5 corresponds to 0.5 ms. For FR2, the network only configures 0 and 0.25 ms.

The above example is for MG configuration. For BWP switching, switching time or delay could include BB processing delay and RF transition time. Examples are provided in the table below, in which type 1 and type 2 denote different UE capabilities, for the following BWP reconfiguration scenarios:

Scenario 1: The reconfiguration involves changing the center frequency of the BWP without changing its BW. The reconfiguration may or may not involve changing the subcarrier spacing (SCS).

Scenario 2: The reconfiguration involves changing the BW of the BWP without changing its center frequency. The reconfiguration may or may not involve changing the SCS.

Scenario 3: The reconfiguration involves changing both the BW and the center frequency of the BWP. The reconfiguration may or may not involve changing the SCS.

Scenario 4: The reconfiguration involves changing only the SCS, where the center frequency and BW of the BWP remain unchanged.

| Frequency Range | Scenario | Type 1 Delay (us) | Type 2 Delay (us) | Comment |
|---|---|---|---|---|
| 1 | 1 | 300 | 1000 | |
|   | 2 | 300 | 1000 | |
|   | 3 | 300 | 1000 | |
|   | 4 | 200 | 475 | No delay required from the RF perspective |
| 2 | 1 | 300 | 1000 | |
|   | 2 | 300 | 1000 | |
|   | 3 | 300 | 1000 | |
|   | 4 | 200 | 475 | No delay required from the RF perspective |

Shorter MGL and/or switching times could also or instead be provided, by implementing one or both of: new MG patterns to shorten MGLs; and shorter BWP switching time requirements. These measures could involve new UE capabilities that might not be satisfied by all UEs. Simultaneous measurement and data reception or transmission could also or instead be provided in other embodiments. A lower Modulation and Coding Scheme (MCS), new precoders for different measurement and reception/transmission antenna sets, and/or new filtering coefficients for such antenna sets could be used to enable simultaneous measurement and data reception or transmission. These and other features are described in detail herein.

In some embodiments, URLLC traffic is prioritized over MGs. If URLLC traffic arrives and/or is scheduled before an MG, then UL transmission or DL reception by a UE could be allowed during the MG, and measurements might not be performed during the MG. In some embodiments, measurements may be performed depending, for example, on the length of an MG. If sufficient time remains in an MG after data transmission is complete, then measurements could still be performed. UE capability could also impact measurement activity during an MG. Some UEs might be capable of simultaneously performing both traffic handling, such as transmission or reception of URLLC traffic, and other operations, such as measurements. For example, a UE could include different transmit and/or receive chains for traffic handling and for measurement. Even for such UEs, however, a transmit or receive chain that is being used for measurement might not be available to be used at the same time for traffic transmission and reception, and in this sense the measurement could still preclude traffic transmission and reception at least by components that are being used for measurement.

For uplink communications, if URLLC traffic arrives at a UE (the traffic is received by or generated by the UE) and the UE sends a Scheduling Request (SR) before an MG, then the UE could prioritize the URLLC traffic by monitoring/receiving a UL grant and performing UL transmission during the MG. The grant monitoring/receiving and the UL transmission are examples of traffic handling operations that are given higher priority than the MG. In this example, if the UE sends the SR before the MG, then UL grant monitoring/receiving and UP transmission have priority over measurement during the MG, and the measurement may or may not be performed.

If URLLC traffic arrives at a UE and the UE starts sending UL data before an MG, then the UE could prioritize the URLLC traffic over the MG by continuing the UL transmission. UL data could be sent by the UE without grant, sometimes known as "with configured grant", or "grant-free". In some cases, a predetermined number of repetitions of the URLLC transmission could be sent, a configuredGrantTimer could be running to enable the UL transmission under configured grant, or the UE could be configured for grant-free UL transmission to transmit the UL data without first receiving a grant of communication resources for the transmission.

Hybrid Automatic Repeat reQuest (HARQ) acknowledgements that correspond to DL URLLC traffic received before the start of an MG could also be prioritized and transmitted during the MG in some embodiments.

In some embodiments, an aperiodic CSI request that corresponds to URLLC traffic received before the start of an MG could also be prioritized and transmitted during the MG.

Traffic priority embodiments disclosed herein relate primarily to prioritizing URLLC traffic. Periodic or semi-persistent channel state information (CSI) reporting, for example, might or might not be given priority over measurement and therefore might or might not be transmitted during an MG. Similarly, Sounding Reference Signal (SRS) transmission might or might not have priority over measurement during an MG.

For DL communications, if URLLC traffic arrives and is scheduled before an MG, then reception of the DL transmission could be performed during the MG.

If a UE is capable of performing measurement during DL reception and/or UL transmission, using separate transmit/receive chains for example, then the UE could be configured to both perform measurement during an MG, while also performing DL reception or UL transmission. In such embodiments, a UE is performing URLLC traffic handling during a time period in which the UE is also to perform another operation that precludes the traffic handling at least by the components involved in performing the measurements during the MG. Simultaneous measurement and traffic handling could be a UE capability that is reported to a network element such as a base station or controller, for example.

In embodiments in which URLLC has priority over measurement during an MG, UL or DL URLLC-related transmission/reception need not be delayed by the entire duration of an MG, which may be particularly useful in meeting URLLC latency requirements. For example, if URLLC traffic has a priority over an MG, then a UE might transmit/receive URLLC traffic instead of performing communication resource switching or measurement, and in some embodiments the communication resource switching or measurement is not performed. In another embodiment, traffic is prioritized for completion first, and then measurement could be performed if there is sufficient time remaining in the MG. A UE that is capable of simultaneous communication and measurement could also have lower MG-related traffic delay, in that communication resource switching and measurement could be performed, by one RF chain for example, at the same time during which another RF chain is receiving/transmitting.

There are also other ways to prioritize URLLC traffic over MGs. Suppose, for example, that URLLC traffic arrives at a UE after the start of an MG. The UE could be configured to monitor for and receive a scheduling grant during the MG. If the UE has switched to measuring communication resources such as a "measuring" BWP of a neighbor cell for performing measurements, then the UE could monitor for and receive the scheduling grant, in a predefined or configured control resource set and search space in an active transmission/reception BWP out of possible multiple active BWPs of serving cell(s) and/or the measuring BWP, for example.

In this scenario of URLLC traffic arrival after the start of an MG, the UE could also be configured to receive or transmit (DL or UL), according to the scheduling grant, during the MG. The reception or transmission could occur in the active BWP or the measuring BWP. For example, the scheduling grant could be received in the measuring BWP, and data reception is subsequently performed in the active BWP. A cross-BWPs scheduling approach similar to cross-carrier scheduling could be used in an embodiment. In another embodiment, the scheduling grant is received in the measuring BWP, and data reception is subsequently performed in the measuring BWP.

A UE could be capable of performing measurement in the measuring BWP, while simultaneously monitoring for the scheduling grant in the active BWP or the measuring BWP. Such a UE could then monitor for and receive the scheduling grant and receive/transmit the scheduled DL/UL transmission in the active BWP or the measuring BWP. As described above, a UE with multiple transmit/receive chains could be configured for simultaneous measurement and reception/transmission, and this UE capability could be signaled to a network element.

The active BWP of the serving cell in which a UE is currently located and the measuring BWP that is used by the UE for measurements related to a neighbor cell could be the same, partially overlapping, or non-overlapping. The UE is configured with the measuring BWP using configuration parameters that are shared between the serving cell and neighbor cell(s).

In a synchronous network, a control channel could be received from one BWP, with data being received and/or transmitted in another BWP. The control channel could be transmitted in one BWP with one numerology, and a data channel could be received/transmitted in another BWP with a different numerology. Symbol durations may be different for such different numerologies, or even between BWPs having the same numerology. Embodiments that involve different numerologies may take absolute switching time into account in determining a slot and the starting symbol of data on the data channel, where data first appears on the data channel after BWP switching.

In embodiments relating to traffic arrival after the start of an MG, a UE is allowed to monitor for and receive a scheduling grant and perform the corresponding DL reception or UL transmission during the MG. This could reduce delay relative to waiting for the end of an MG before monitoring for the scheduling grant and/or performing DL reception or UL transmission. Delay reduction could be useful in meeting URLLC latency requirements.

Prioritizing traffic could be summarized in an embodiment as follows: if an MG overlaps, by at least one symbol for example, with a monitoring occasion of a control channel, a transmitted control channel, and/or a corresponding assigned UL or DL data channel, then URLLC-related traffic handling such as transmission or reception has priority over measurement during the MG, and measurement may or may not also be performed. This could reduce or avoid additional delay on UL or DL URLLC-related transmission/reception, which could be especially important for meeting URLLC latency requirements.

Overlap on a subframe level could also or instead be considered. According to LTE 36.133, for example, subframes fully or partially overlapping with the measurement gaps on E-UTRAN serving cells cannot be used for DL/UL transmission. Because NR supports non-slot based scheduling, however, partial overlapping subframes could be used for DL/UL transmission in accordance with the present disclosure, to prioritize URLLC traffic over MGs and thereby potentially shorten MG-related traffic handling delays.

Another way to prioritize URLLC traffic over MGs involves MG configuration. For example, in some embodiments, URLLC traffic is predictable, and possible or expected traffic arrival timing could be taken into account in MG configuration. MGs could be configured to not overlap with time periods in which URLLC traffic may arrive at a UE. Such MG configuration could entirely avoid delay on UL or DL URLLC-related transmission/reception caused by MGs, which again could be useful in meeting URLLC latency requirements.

Traffic prioritizing embodiments described herein could involve configuring UEs to operate in a new way, to perform traffic handling at times when such traffic handling normally cannot be performed by at least some UE components, such as during MGs. Some embodiments, such as embodiments that enable simultaneous traffic handling and measurement, could be applicable to certain types of UEs that have particular UE capabilities. Multiple transmit/receive chains are an example of such a UE capability. Other UE capabilities could also or instead be implemented in other embodiments.

For example, UEs with certain hardware or computational capabilities might be able to complete particular operations faster than other UEs. Measurements and communication resource switching are examples of operations that could potentially be performed faster by some UEs, such as higher-end UEs that have faster processors, chipsets, and/or other components than other UEs.

Figure 4:
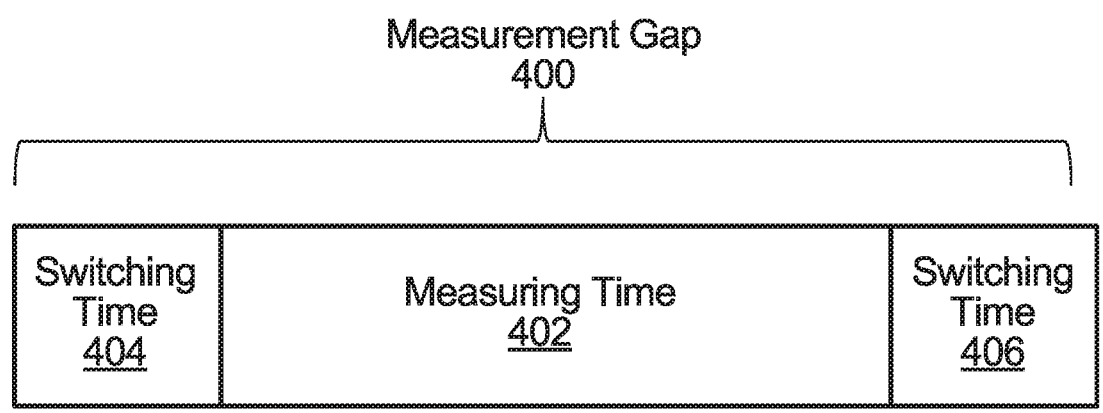
FIG. 4 is a block diagram illustrating an example Measurement Gap.

FIG. 4 is a block diagram illustrating an example MG 400, which includes a measuring time 402, and switching times 404, 406 before and after the measuring time. According to TS38.133, for example, if a measurement gap is needed, then a UE is not expected to detect a Synchronization Signal Block (SSB) that starts earlier than the gap starting time plus the switching time 404, or to detect an SSB that ends later than the gap time less the switching time 406. Switching time is 0.5 ms for frequency range FR1 and 0.25 ms for frequency range FR2, for example.

This type of MG 400 is applicable in embodiments in which different communication resources are used for measurements and for traffic transmission and reception. A measuring BWP and an active BWP as referenced herein are examples of such different communication resources. In an embodiment in which different measuring and active BWPs are configured for a UE, when measurements are to be made the UE switches to the measuring BWP during the switching time 404, performs measurements during the measuring time 402, and then switches back to the active BWP during the switching time 406. MG length includes all of these times in the example shown. It should be noted, however, that not every MG necessarily includes switching times 404, 406, because in some embodiments no switching is required before measurements are taken. Furthermore, not every switching time is necessarily associated with an MG. Communication resource switching such as BWP switching could be performed at other times and not only for performing measurements.

From FIG. 4, it can be seen that one way to reduce MG length is to reduce the measurement time 402. For example, a UE could be configured to perform measurements by using fewer Synchronization Signal Blocks (SSBs), such as only one SSB (4 Orthogonal Frequency Division Multiplexing (OFDM) symbols) per MG, or a shorter CSI Reference Signal (CSI-RS), such as a one-symbol CSI-RS or two-symbol CSI-RS with larger bandwidth. In some embodiments, 4-symbol CSI-RS can also be used. For 15 kHz subcarrier spacing (SCS), for example, the duration of 4 OFDM symbols=0.285 ms, and the duration of 1 OFDM symbol=0.0714 ms. In some embodiments, measurements could be collected over multiple MGs, using one SSB or one-symbol CSI-RS per MG for example, then averaged or otherwise filtered over multiple SSBs or symbols, and reported after a configured number of measurements have been taken.

Switching times, whether or not associated with an MG, could also or instead be reduced, to below 0.5 ms in FR1 and/or 0.25 ms in FR2 in examples that are referenced above.

For an MG of the type shown in FIG. 4 and the 4-symbol and 1-symbol measuring time examples above, total MG length (MGL) is at least 4*T_OFDM+2*ST or T_OFDM+ 2*ST, where T_OFDM=duration of one OFDM symbol, which depends on SCS, and ST=duration of switching time 404, 406.

Shorter MGLs could be useful in meeting URLLC latency requirements, by reducing potential traffic handling delays associated with MGs. Deployment of shorter MGLs could involve, for example, introducing a new UE capability, such as "supporting shorter switching time" of a certain value. TS38.133 specifies gap pattern configurations in Table 9.1.2-1, and one or more new gap pattern configurations with MGL<0.5 ms, for example, could be added to such a table and/or other relevant MGL specification. New gap pattern configurations could also have other parameters, such as MG Repetition Period (MGRP)={20, 40, 60, 160} for URLLC, for example. TS38.133 also specifies applicability for gap pattern configurations supported by UEs with NR standalone operation, in Table 9.1.2-3. One or more new entries could be added to such a table and/or other relevant specification, to allow gap pattern configurations with shorter MGL for FR1, FR2, or both, for example. The following table provides examples of new MG patterns:

| Gap Pattern Id | Measurement Gap Length (MGL, ms) | Measurement Gap Repetition Period (MGRP, ms) |
| --- | --- | --- |
| 24 | 0.6 | 20 |
| 25 | 0.6 | 40 |
| 26 | 0.6 | 80 |
| 27 | 0.6 | 160 |
| 28 | 0.8 | 20 |
| 29 | 0.8 | 40 |
| 30 | 0.8 | 80 |
| 31 | 0.8 | 160 |
| 32 | 0.35 | 20 |
| 33 | 0.35 | 40 |
| 34 | 0.35 | 80 |
| 35 | 0.35 | 160 |
| 36 | 0.4 | 20 |
| 37 | 0.4 | 40 |
| 38 | 0.4 | 80 |
| 39 | 0.4 | 160 |

Although some of these example patterns have MGL larger than 0.5 ms, such patterns could still be useful for low-latency traffic such as URLLC, depending on the specific latency requirement of the traffic. In addition, some types of devices or traffic may require a shorter BWP switching time than those specified above, which may in some examples depend on UE capabilities that might be signaled to network equipment.

In some embodiments, communication resource switching, and therefore the switching times 404, 406 for an MG, could be avoided entirely. This could be especially useful, for example, for a UE that has very stringent URLLC requirements for latency and does not have multiple Radio Frequency (RF) transmit/receive chains or any other capability for simultaneous measurement and transmission/reception. A serving cell and one or more neighbor cells could be configured, by a network element, to use same communication resources, such as the same BWP configuration, for measurements and transmission/reception. For example, the same bandwidth, the same center frequency, and the same numerologies of SSBs/CSI-RS could be used between serving and neighbor cells, to avoid communication resource switching and switching times for MGs.

A common communication resource configuration for measurement and transmission/reception could be implemented, for example, by specifying in a standard that UEs with a certain capability need not use an MG with switching times. Measuring times could be configured through Radio Resource Control (RRC) signaling or through other UE configuration, or otherwise coordinated through signaling between serving and neighbor cells by UEs or one or more network elements, but measurements would not require communication resource switching or involve delays due to switching times. Thus, UEs with URLLC traffic and with a certain capability may be configured with shorter MGL, resulting in shorter measurement time and/or switching time. Traffic handling delays could thereby be reduced, to aid in meeting URLLC latency requirements. Parameters such as times at which measurements are to be performed, measurement gap type such as with or without switching times, measurement gap length, measurement time, and/or other measurement configuration settings could be specified in a standard or configured, through RRC signaling or otherwise, in other embodiments as well. Such specification and configuration options are not restricted only to embodiments that involve common communications resource configuration for measurement and transmission/reception.

Multiple transmit/receive chains are described above as one example of a UE capability to enable simultaneous measurement and transmission/reception. A UE could also optionally implement another UE capability, to use respective subsets of antennas for measurement and transmission/reception. In such embodiments, some UE antennas are used for measurements and other UE antennas are used for transmission/reception. This is also referred to herein as partial antenna usage.

UE antennas could be selected as measurement or transmission/reception antennas based on link quality, for example. UE antennas associated with links that have better quality than other links could be selected for use for transmission/reception, and the rest of the UE antennas could then be used for measurements. Antenna subsets could be dynamic, and change with link quality and/or any other selection criterion or criteria, or predefined in other embodiments.

The number of UE antennas for measurement and/or the number of UE antennas for transmission/reception could be configured and signaled to a UE, or determined at the UE and reported to a network element.

Non-uniform antenna configurations are possible, with the different subsets of UE antennas positioned at different locations, for example. The different antenna sets could, but need not necessarily, be quasi co-located. There could be quasi co-location (QCL) information from the UE side, as opposed to a network side, in which case a network element could assume different QCLs from different UE antenna subsets during UL transmission. With such a spaced antenna configuration, interference between the different antenna subsets could be reduced. Although spacing could be a challenge in certain types of UE implementations, in at least some implementations such as "vehicle to anything" (V2X) applications a UE is a vehicle, which would be expected to have sufficient space for antenna subset separation.

A UE implementing Non-Coherent-Joint Transmission (NC-JT) represents one example of a use case in which a UE has multiple antenna subsets and the UE can maintain multiple connections with multiple Transmit-Receive Points (TRPs) for dual or higher-order connectivity. In some embodiments single or multiple beams from multiple TRPs can be used.

Multiple antenna subsets could be used not only for UL transmissions from a UE, but also or instead for reception of DL transmissions.

Any of various features could be implemented in conjunction with usage of respective antenna subsets for measurement and transmission/reception, to potentially mitigate the impact of using only a subset of UE antennas instead of all of the antennas.

For PDCCH reception, for example, higher application layer (AL) and/or other PDCCH reliability improvement techniques such as PDCCH repetition could be implemented. This could change UE behavior by configuring a UE to use only the highest AL for PDCCH monitoring during an MG.

A lower MCS could also or instead be used. For example, a lower MCS could be added to an MCS table, or a prediction model could be introduced to scale down MCS, based on partial antenna usage.

CSI feedback/reporting based on partial antenna usage could also or instead be provided in some embodiments. More options could be added into CSI report configuration for partial antenna usage, for example. The UE could be signaled to generate and send a partial antenna CSI report, or the UE could initiate the report based on a configured MG.

Precoding could also or instead be based on partial antenna usage. The same or different precoders could be used for measurement and/or transmission/reception, for control, data, Reference Signal, etc. One or more options to report multiple Precoding Matrix Indicators (PMIs) for different precoding associated with different sets of antennas could be provided. Another possible option involves reusing predefined codebooks that are associated with antenna ports. For non-uniform antenna configurations, one or more new precoders could be introduced.

In partial antenna usage embodiments, it may be desirable to provide features that are intended to improve measurement accuracy. Such features could include, for example, using larger bandwidth for CSI-RS, filtering over multiple SSBs in frequency, and/or averaging over more measurements in time. Time averaging could be implemented, for example, by changing filtering coefficients. For example, more L3 filtering coefficients could be added.

Advanced receivers, such as Successive Interference Cancellation (SIC) receivers, could also or instead be used to potentially improve reception of DL transmissions and/or signals for measurement during an MG.

These and/or other features could be implemented independently or in combination. For example, for a UE with 4 antennas, if only 2 antennas are used for data transmission/reception, then a lower MCS could be used, as well as a precoder for 2 antennas instead of 4. Because only 2 antennas are used for measurements in this example, measurements may have lower accuracy, and one or more filtering coefficients, for L3 and/or L1 filtering for example, could also be used to lengthen an impulse response of filtering so that more measurement samples are taken into account in a filtering process.

In TS38.331, for example, measured results are filtered before they are used for evaluation of reporting criteria or for measurement reporting, according to the following filtering formula:

$$F_n = (1-a) \cdot F_{n-1} + a \cdot M_n$$

where $M_n$ is a latest received measurement result from the physical layer;

$F_n$ is an updated filtered measurement result that is used for evaluation of reporting criteria or for measurement reporting;

$F_{n-1}$ is a previous filtered measurement result, where $F_0$ is set to $M_1$ when the first measurement result from the physical layer is received; and $a=\frac{1}{2}^{(k/4)}$, where k is the filterCoefficient for the corresponding measurement quantity received by quantityConfig.

The parameter k is currently in the range of 0, 1, . . . , 19. To have a longer filter response, the parameter a should be small, with a value k larger than 19. For example, the value of k could range up to 32.

Partial antenna usage embodiments, like multi-chain embodiments, may enable simultaneous measurement and transmission/reception, to mitigate traffic handling delays associated with MGs. As also mentioned above, this could be useful in satisfying URLLC latency requirements.

Embodiments are described herein primarily in the context of potential challenges that are presented by MGs in meeting URLLC latency requirements. As described with reference to FIG. 4, for example, communication resource switching can also be problematic for introducing delays, and such switching might not only be performed for an MG.

If URLLC traffic is identified at a UE, then traffic handling for that traffic could be prioritized over communication resource switching such as BWP switching. This could impact UE behavior in that the UE should not expect to detect a DCI format 0_1 indicating active UL BWP change, or a DCI format 1_1 indicating active DL BWP change, if the DCI is based on URLLC_RNTI and schedules a UL transmission or a DL transmission, respectively. Other techniques, including but not limited to other Physical (PHY)-layer-based techniques, could also or instead be used to identify URLLC traffic. PHY-layer-based techniques include, for example, detection based on any one or more of:

RNTI, such as URLLC_RNTI described above;

occurrence of multiple PDCCH monitoring occasions in a slot, which is possible for URLLC traffic;

a compact DCI that is used only for URLLC traffic;

other indication(s) via dynamic signaling.

URLLC traffic could also or instead be identified via higher layer signaling, in a logical channel for example.

A UL transmission related to URLLC traffic handling could be any of those disclosed herein, including SR, HARQ-ACK, UL data with/without grant, Periodic/Aperiodic/Semi-persistent CSI reports, and SRS for Physical Uplink Control Channel (PUCCH) and/or Physical Uplink Shared Channel (PUSCH) for example. DL transmission to the UE could be a DL data channel such as Physical Downlink Shared Channel (PDSCH). As in other traffic prioritizing embodiments disclosed herein, prioritizing traffic handling for URLLC traffic over communication resource switching could reduce or avoid delays for URLLC traffic and be useful in meeting URLLC latency requirements.

Figure 5:
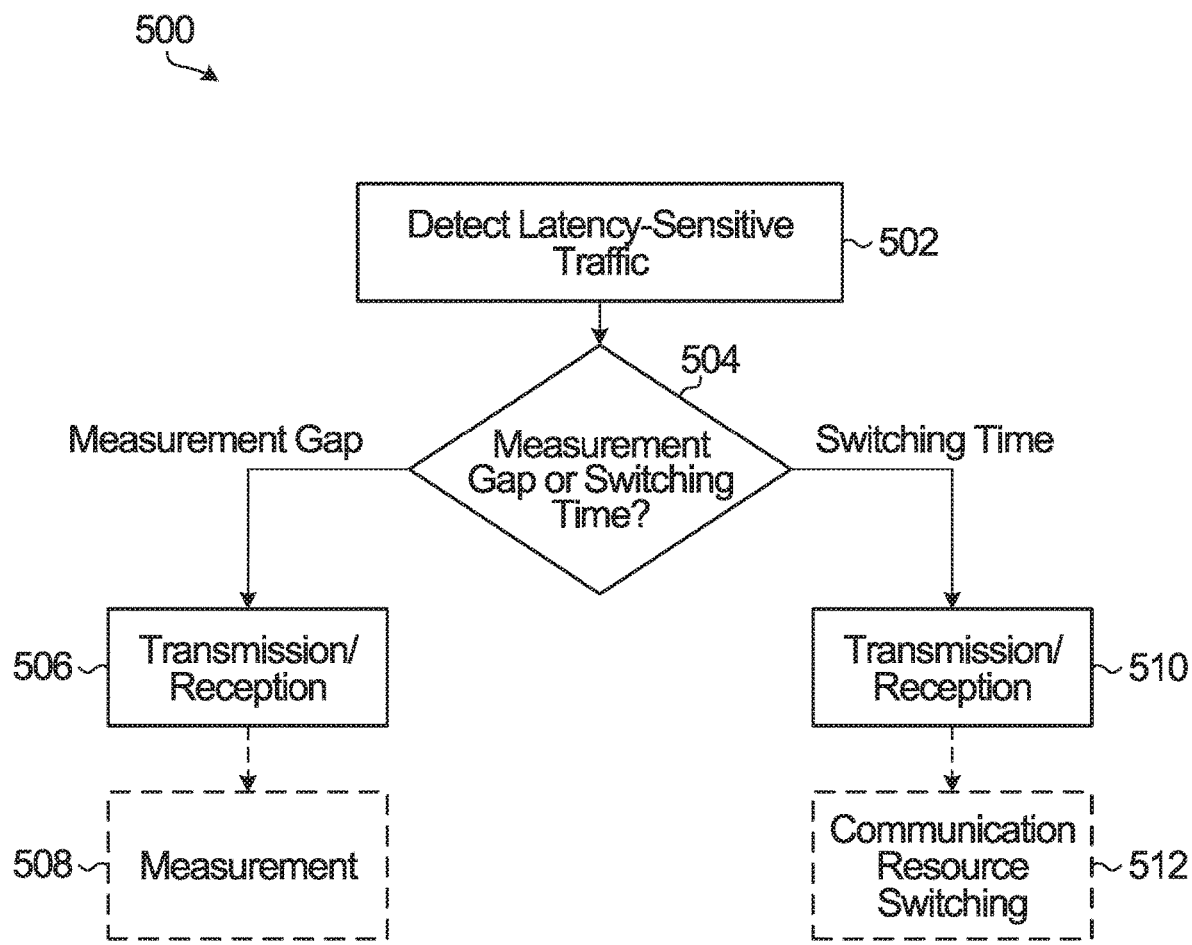
FIG. 5 is a flow diagram illustrating an example method according to an embodiment.

FIG. 5 is a flow diagram illustrating an example method according to an embodiment. The example method 500 involves an operation 502 of detecting latency-sensitive traffic, such as URLLC traffic, at a user equipment (UE). Either or both of transmission or reception associated with the latency-sensitive traffic could be performed at 506, 510 even during a measurement gap or a switching time, shown at 504. For example, in some embodiments, transmission/reception could be performed at 506 instead of measurement of received signal strength during a time period in which a measurement gap has been configured for the UE to perform the measurement.

Measurement could still be performed at 508. For example, the measurement could be performed at 508 during a remainder of the measurement gap after the transmission/reception is completed.

In some embodiments, the measurement gap includes a measuring time, as shown by way of example at 402 in FIG. 4, and a method also includes shortening the measuring time.

As shown at 404, 406 in FIG. 4, a measurement gap could include a switching time, or multiple switching times, associated with communication resource switching. A method could then involve shortening the switching time(s).

Switching times could, but need not necessarily, be associated with a measurement gap. A switching time could be ignored, so that communication resource switching is not performed if latency-sensitive traffic is detected at 502. Transmission/reception could then be performed instead of communication resource switching. Communication resource switching could instead be delayed until completion of the transmission/reception at 510, and then be performed at 512.

In some embodiments, communication resources are configured to avoid such communication resource switching.

A UE could be capable of performing transmission/reception associated with the latency-sensitive traffic at 506 or 510, in addition to measurement during a measurement gap at 508 or communication resource switching at 512. The transmission/reception could be simultaneous with, or at least partially overlap in time with, the measurement during a measurement gap at 508 and/or the communication resource switching at 512.

For example, the transmission/reception at 506, 510 could involve using a first subset of antennas of the UE for the transmission/reception. The measurement during the measurement gap at 508, or the communication resource switching at 512, could then involve using a second subset of the antennas, different from the first subset of antennas, for the measurement or the communication resource switching.

A method could also involve determining, at the UE, the first subset of antennas and the second subset of antennas based on quality of communication links associated with the antennas of the UE.

Such partial antenna usage for the transmission/reception at 506, 510 and the measurement 508 or the communication resource switching at 512 in the example above, could involve one or more of: using for the first subset (and/or the second subset) a lower Modulation and Coding Scheme (MCS) relative to an MCS for all of the antennas of the UE; using for the first subset a first precoder that is different from a precoder for all of the antennas and/or different from a second precoder for the second subset; using for the second subset a precoder that is different from a precoder that is used for all of the antennas; using for the first subset first filtering coefficients, such as L3 filtering coefficients for example, that are different from filtering coefficients that are used for all of the antennas and/or second filtering coefficients that are used for the second subset; and using for the second subset first filtering coefficients different from filtering coefficients that are used for all of the antennas.

The method 500 in FIG. 5 is an example. Other embodiments could include any one or more of the following features:

the detecting includes physical layer-based detection;

the physical layer-based detection, or more generally the detecting, includes identifying the latency-sensitive traffic based on one or more of: RNTI, occurrence of multiple PDCCH monitoring occasions in a slot, a compact DCI, and other indication(s) via signaling;

the detecting includes detection based on a logical configuration;

the detection based on a logical configuration, or more generally the detecting, includes identifying the latency-sensitive traffic based on a logical channel number;

performing transmission or reception includes any one or more of: uplink transmission and downlink reception;

uplink transmission includes transmitting one or more of: a scheduling request; an acknowledgement of downlink reception; uplink data; control information that is related to the latency-sensitive traffic;

downlink reception includes one or more of: monitoring for control information that is related to the latency-sensitive traffic, receiving CSI-RS signals, and receiving downlink data;

transmitting any one or more of the following during the time period: periodic, aperiodic, and/or semi-persistent Channel State Information (CSI) reports; Sounding Reference Signals;

the measurement gap is longer than a delay constraint of the latency-sensitive traffic, such as a URLLC latency requirement;

a measuring time of the measurement gap is longer than a delay constraint of the latency-sensitive traffic;

a switching time of the measurement gap is longer than a delay constraint of the latency-sensitive traffic.

Embodiments are described herein primarily in the context of example methods and operations. Other embodiments are also contemplated.

For example, a non-transitory processor-readable medium could store instructions which, when executed by one or more processors, cause the one or more processors to perform a method disclosed herein.

Apparatus embodiments are also contemplated. In one embodiment, a UE includes a processor and a non-transitory computer readable storage medium storing instructions for execution by the processor. The instructions cause the processor to perform a method as disclosed herein. For example, such a method could involve detecting latency-sensitive traffic and performing transmission/reception, instead of or in addition to measurement or communication resource switching, as described above with reference to FIG. 5. The instructions could cause the processor to perform the measurement during a remainder of the measurement gap after the transmission/reception is completed, for example.

In some embodiments, the measurement gap includes a measuring time such as 402 (FIG. 4), and the instructions further cause the processor to shorten the measuring time.

A measurement gap could include a switching time, or multiple switching times, associated with communication resource switching. FIG. 4, for example, shows switching times 404, 406. The instructions could further cause the processor to shorten the switching time(s).

A switching time, which might or might not be associated with a measurement gap, could be ignored if latency-sensitive traffic is detected. The instructions could cause the processor to perform transmission/reception associated with latency-sensitive traffic instead of communication resource switching. The instructions could instead cause the processor to delay communication resource switching until completion of the transmission/reception.

In some embodiments, the instructions cause the processor to configure communication resources to avoid communication resource switching.

A UE could be capable of simultaneously performing transmission/reception associated with the latency-sensitive traffic and measurement or communication resource switching, and the instructions could cause the processor in such a UE to perform the transmission/reception in addition to measurement during a measurement gap or during communication resource switching.

For example, a UE could include multiple antennas, and the transmission/reception could involve using a first subset of antennas of the UE for the transmission/reception and using a second, different, subset of the antennas for the measurement during the measurement gap or the communication resource switching. The instructions could further cause the processor to determine the first subset of antennas and the second subset of antennas based on quality of communication links associated with the antennas of the UE.

Partial antenna usage by a UE could involve using a lower MCS, different precoders, and/or different filtering coefficients, as described elsewhere herein.

Apparatus embodiments could also or instead include other features disclosed herein, such as any one or more of the following features:

the detecting includes physical layer-based detection;

the physical layer-based detection, or more generally the detecting, includes identifying the latency-sensitive traffic based on one or more of: RNTI, occurrence of multiple PDCCH monitoring occasions in a slot, a compact DCI, and other indication(s) via signaling;

the detecting includes detection based on a logical configuration;

the detection based on a logical configuration, or more generally the detecting, includes identifying the latency-sensitive traffic based on a logical channel number;

transmission or reception includes any one or more of: uplink transmission and downlink reception;

uplink transmission includes transmitting one or more of: a scheduling request; an acknowledgement of downlink reception; uplink data; control information that is related to the latency-sensitive traffic;

downlink reception includes one or more of: monitoring for control information that is related to the latency-sensitive traffic, receiving CSI-RS signals, and receiving downlink data;

transmitting any one or more of the following during the time period: periodic, aperiodic, and/or semi-persistent Channel State Information (CSI) reports; Sounding Reference Signals;

the measurement gap is longer than a delay constraint of the latency-sensitive traffic;

a measuring time of the measurement gap is longer than a delay constraint of the latency-sensitive traffic;

a switching time of the measurement gap is longer than a delay constraint of the latency-sensitive traffic.

Many of the features described herein relate to UE embodiments. It should be appreciated, however, that some embodiments could involve network-side features. For example, one way to prioritize latency-sensitive traffic such as URLLC traffic over MGs involves MG configuration. In some embodiments, latency-sensitive traffic is predictable, and possible or expected traffic arrival timing could be taken into account in MG configuration. A base station, controller, or other network equipment could determine one or more time periods during which latency-sensitive traffic is expected to arrive at a UE, and configure MGs for a UE to not overlap with the determined time period(s). Such MG configuration could mitigate or entirely avoid MG delay of UL or DL transmission/reception, because MGs do not overlap with correctly predicted latency-sensitive traffic.

If latency-sensitive traffic is detected at a UE, then traffic handling for that traffic could be prioritized over communication resource switching such as BWP switching. As noted above, this could impact UE behavior in that the UE should not expect to detect a DCI format 0_1 indicating active UL BWP change, or a DCI format 1_1 indicating active DL BWP change, if the DCI is based on URLLC_RNTI and schedules a UL transmission or a DL transmission, respectively. This is illustrative of other features that could be implemented in network equipment. A method could involve determining, at network equipment, whether a UE is configured to handle latency-sensitive traffic, based on URLLC_RNTI, for example, and transmitting to the UE control signaling that maintains active communication resources for transmission and/or reception associated with the latency-sensitive traffic. DCI format 0_1 and DCI format 1_1 are examples of such control signaling, and in an embodiment a DCI in these formats would not indicate an active UL BWP change or an active DL BWP change for scheduling a UL transmission or a DL transmission, respectively. Active communication resources for transmission and/or reception associated with the latency-sensitive traffic are maintained in this example by avoiding active BWP changes.

Some apparatus embodiments herein refer to a processor. It should also be appreciated that one or more steps of the embodiment methods provided herein may be performed by corresponding units or modules. For example, a signal may be received by a receiving unit or a receiving module. Similarly, a signal may be transmitted by a transmitting unit or a transmitting module. A signal may be processed by a processing unit or a processing module. Other operations could be performed by these and/or other modules. For example, a receiving unit, a receiving module, a transmitting unit, a transmitting module, and/or a controller or control module could perform operations associated with traffic handling and other operations as disclosed herein.

Respective units/modules could be implemented using hardware, software, or a combination thereof. For instance, one or more of the units/modules may be an integrated circuit, such as field programmable gate arrays (FPGAs) or application-specific integrated circuits (ASICs). It will be appreciated that where the modules are implemented using software, they may be retrieved by a processor, in whole or part as needed, individually or together for processing, in single or multiple instances, and that the modules themselves may include instructions for further deployment and instantiation.

The previous description of some embodiments is provided to enable any person skilled in the art to make or use an apparatus, method, or computer/processor readable medium according to the present disclosure.

Various modifications to the embodiments described herein may be readily apparent to those skilled in the art, and the generic principles of the methods and devices described herein may be applied to other embodiments. Thus, the present disclosure is not intended to be limited to the embodiments shown herein but is to be accorded the widest scope consistent with the principles and novel features disclosed herein.

For example, the present disclosure encompasses new UE behaviors that in some embodiments give URLLC traffic priority over MG and/or BWP switching, new MG patterns including new measuring time and/or switching time, new BWP switching time, and new UE capabilities. Other ways to provide such features may be or become apparent to those skilled in the art on a review of the present disclosure.

Embodiments could be applied to MGs, and/or to BWP switching that is or is not associated with MGs. BWP switching could involve switching between BWPs of a primary cell or BWPs of different secondary cells, or between a BWP of a primary cell and a BWP of a secondary cell, in the same master or secondary cell group in Carrier Aggregation (CA), or between BWPs of primary or secondary cells in a master cell group and BWPs of primary or secondary cells in secondary cell groups in Dual Connectivity (DC), for example.

For CA, switching could be within a master cell group (MCG), between the BWP of a primary cell of the MCG and a BWP of secondary cell of the MCG or between the BWPs of two secondary cells of the MCG. Switching could also or instead be within a secondary cell group (SCG)—between the BWP of a primary cell of the SCG and the BWP of a secondary cell of the SCG or between the BWPs of two secondary cells of the SCG.

For Dual Connectivity (DC) between an MCG and an SCG, switching could include any one or more of the following:

between a BWP of a primary cell of the MCG and a BWP of a primary cell of the SCG;

between the BWP of the primary cell of the MCG and a BWP of a secondary cell of the SCG;

between a BWP of a secondary cell of the MCG to the BWP of the primary cell of SCG;

between a BWP of a secondary cell of the MCG to a BWP of a secondary cell of the SCG.

In DC, MGs could be considered in the context of cell groups and not just individual cells. One cell group, the MCG, is a main serving cell group and another cell group, the SCG, is a neighbour cell group, and MGs are for neighbor cell measurement.

Features as explicitly disclosed herein, and possibly other features, could be adapted to specific applications. Consider a smart factory URLLC use case, which could use FR2 for example. Where beam-based transmission is used, multiple beam measurements might be performed during measuring times. Different SSB indexes corresponding to respective different beams could be used. If partial usage of antennas is implemented, with multiple antenna panels for example, so that measurement and DL/UL transmission may be performed simultaneously, then parameters such as beam failure and/or beam reliability could be taken into account to provide more robust beam-based communications for at least DL/UL transmission. Although a smart factory URLLC use case is referenced in this example, these features could be implemented in other applications.

MGL reduction could be applied to beam-based communication, by limiting the number of beams that are used for measurements during one MG. For example, only one beam or a small number of beams could be used for measurements in an MG so that MGL can be reduced relative to scanning all beams during an MG. Different MGs could be used for respective subsets of beams, such as one MG for a first subset of one or more beams, a second MG for a second subset of one or more different beams, and so on. This could involve a network element signaling a beam pattern through which the UE cycles in a sequence of MGs, or signaling one or more beam identifiers for each MG to the UE. Measurements could be limited to only those beams over which a signal is received, by applying filtering only on beams with a signal in some embodiments.

Some of the embodiments disclosed herein refer to shortening or reducing MGL. Dynamic or adaptive MGL is also contemplated. For example, if a UE has not detected URLLC traffic or data, then a longer MGL could be used to get more accurate measurements, but an MG could be cut short to transmit/receive data if the UE detects traffic or data during an MG. Dynamic MGL could be extended to embodiments in which MGL is determined based on recent traffic or data activity. A longer MGL could be used if traffic or data has not been detected for a certain amount of time before an MG for example, and a shorter MGL might otherwise be preferred.

Other examples consistent with the present disclosure are also provided below.

According to an example 1, a method involves: detecting latency-sensitive traffic at a UE; and performing, at the UE, transmission or reception associated with the latency-sensitive traffic instead of measurement of received signal strength during a time period in which a measurement gap has been configured for the UE to perform the measurement of received signal strength.

According to an example 2, the method of example 1 further involves: performing the measurement during a remainder of the measurement gap after the transmission or reception is completed.

According to an example 3, in the method of example 1 the measurement gap is or includes a measuring time, and the method further involves: shortening the measuring time.

According to an example 4, in the method of any one of examples 1-3, the measurement gap is or includes a switching time associated with communication resource switching.

According to an example 5, the method of example 4 further involves: shortening the switching time.

According to an example 6, the method of example 4 further involves: configuring communication resources to avoid the communication resource switching.

According to an example 7, a method involves: detecting latency-sensitive traffic at a UE; and performing, at the UE, transmission or reception associated with the latency-sensitive traffic in addition to measurement of received signal strength during a time period in which a measurement gap has been configured for the UE to perform the measurement of received signal strength.

According to an example 8, in the method of example 7 performing transmission or reception in addition to measurement during the measurement gap involves using a first subset of antennas of the UE for the transmission or reception, and using a second subset of the antennas, different from the first subset of antennas, for the measurement.

According to an example 9, the method of example 8 further involves: determining the first subset of antennas and the second subset of antennas based on quality of communication links associated with the antennas of the UE.

According to an example 10, in the method of example 8 or example 9 using the first subset of antennas involves one or more of: using for the first subset a lower MCS relative to an MCS for all of the antennas of the UE; using for the first subset a first precoder that is different from a second precoder used for the second subset; using for the first subset first filtering coefficients that are different from second filtering coefficients used for the second subset.

According to an example 11, in the method of any one of examples 1-10 the latency-sensitive traffic is or includes URLLC traffic.

According to an example 12, in the method of any one of examples 1-11 the detecting is or includes physical layer-based detection.

According to an example 13, in the method of example 12 the physical layer-based detection involves identifying the latency-sensitive traffic based on one or more of: RNTI; occurrence of multiple PDCCH monitoring occasions in a slot; a compact DCI; other indication(s) via signaling.

According to an example 14, in the method of any one of examples 1-11 the detecting is or includes detection based on a logical configuration.

According to an example 15, in the method of example 14 the detection based on a logical configuration is or includes identifying the latency-sensitive traffic based on a logical channel number.

According to an example 16, in the method of any one of examples 1-15 performing transmission or reception is or includes any one or more of: uplink transmission; downlink reception.

According to an example 17, in the method of example 16 the uplink transmission is or includes transmitting one or more of: a scheduling request; an acknowledgement of downlink reception; uplink data; control information that is related to the latency-sensitive traffic.

According to an example 18, in the method of example 16 or example 17 the downlink reception is or includes one or more of: monitoring for control information that is related to the latency-sensitive traffic; receiving CSI-RS signals; receiving downlink data.

According to an example 19, the method of any one of examples 1-18 further involves: transmitting any one or more of the following during the time period: periodic, aperiodic, and/or semi-persistent CSI reports; Sounding Reference Signals.

According to an example 20, in the method of any one of examples 1-19 the measurement gap is longer than a delay constraint of the latency-sensitive traffic.

According to an example 21, in the method of any one of examples 1-19 the measurement gap is or includes a measuring time, and the measuring time is longer than a delay constraint of the latency-sensitive traffic.

According to an example 22, in the method of any one of examples 1-19 the measurement gap is or includes a switching time, and the switching time is longer than a delay constraint of the latency-sensitive traffic.

According to an example 23, a non-transitory processor-readable medium stores instructions which, when executed by one or more processors, cause the one or more processors to perform a method according to any one of examples 1-22.

According to an example 24, a UE includes: a processor; and a non-transitory computer readable storage medium storing instructions for execution by the processor, the instructions causing the processor to perform a method according to any one of examples 1-22.

According to an example 25, a UE includes: a processor; and a non-transitory computer readable storage medium storing instructions for execution by the processor, the instructions causing the processor to perform a method that involves: detecting latency-sensitive traffic; and performing transmission or reception associated with the latency-sensitive traffic instead of measurement of received signal strength during a time period in which a measurement gap has been configured for the UE to perform the measurement of received signal strength.

According to an example 26, for the UE of example 25 the instructions further cause the processor to: perform the measurement during a remainder of the measurement gap after the transmission or reception is completed.

According to an example 27, for the UE of example 25 the measurement gap is or includes a measuring time, and the instructions further cause the processor to: shorten the measuring time.

According to an example 28, for the UE of any one of examples 25-27 the measurement gap is or includes a switching time associated with communication resource switching.

According to an example 29, for the UE of example 28 the instructions further cause the processor to: shorten the switching time.

According to an example 30, for the UE of example 28 the instructions further cause the processor to: configure communication resources to avoid the communication resource switching.

According to an example 31, a UE includes: a processor; and a non-transitory computer readable storage medium storing instructions for execution by the processor, the instructions causing the processor to perform a method that involves: detecting latency-sensitive traffic; and performing transmission or reception associated with the latency-sensitive traffic in addition to measurement of received signal strength during a time period in which a measurement gap has been configured for the UE to perform the measurement of received signal strength.

According to an example 32, the UE of example 31 also includes multiple antennas, and the transmission or reception in addition to measurement during the measurement gap is or includes using a first subset of the antennas for the transmission or reception, and using a second subset of the antennas, different from the first subset of the antennas, for the measurement.

According to an example 33, for the UE of example 32 the instructions further cause the processor to: determine the first subset of the antennas and the second subset of the antennas based on quality of communication links associated with the antennas.

According to an example 34, for the UE of example 31 or example 33 using the first subset of antennas involves one or more of: using for the first subset a lower MCS relative to an MCS for all of the antennas of the UE; using for the first subset a first precoder that is different from a second precoder used for the second subset; using for the first subset first filtering coefficients that are different from second filtering coefficients used for the second subset.

According to an example 35, for the UE of any one of examples 25-34 the latency-sensitive traffic is or includes URLLC traffic.

According to an example 36, for the UE of any one of examples 25-35 the detecting is or includes physical layer-based detection.

According to an example 37, for the UE of example 36, the physical layer-based detection is or includes identifying the latency-sensitive traffic based on one or more of: RNTI; occurrence of multiple PDCCH monitoring occasions in a slot; a compact DCI; other indication(s) via signaling.

According to an example 38, for the UE of any one of examples 25-35 the detecting is or includes detection based on a logical configuration.

According to an example 39, for the UE of example 38 the detection based on a logical configuration is or includes identifying the latency-sensitive traffic based on a logical channel number.

According to an example 40, for the UE of any one of examples 25-39 the transmission or reception is or includes any one or more of: uplink transmission; downlink reception.

According to an example 41, for the UE of example 40 the uplink transmission is or includes transmitting one or more of: a scheduling request; an acknowledgement of downlink reception; uplink data; control information that is related to the latency-sensitive traffic.

According to an example 42, for the UE of example 40 or example 41 the downlink reception is or includes one or more of: monitoring for control information that is related to the latency-sensitive traffic; receiving CSI-RS signals; receiving downlink data.

According to an example 43, for the UE of any one of examples 25-42 the instructions further cause the processor to: transmit any one or more of the following during the time period: periodic, aperiodic, and/or semi-persistent CSI reports; Sounding Reference Signals.

According to an example 44, for the UE of any one of examples 25-43 the measurement gap is longer than a delay constraint of the latency-sensitive traffic.

According to an example 45, for the UE of example 25, example 26, or any one of examples 31-34 the measurement gap is or includes a measuring time, and the measuring time is longer than a delay constraint of the latency-sensitive traffic.

The invention claimed is:

1. A method comprising:
   detecting arrival or scheduling of latency-sensitive traffic at a user equipment (UE) before a start of a measurement gap that has been configured for the UE, wherein the UE is to perform measurement of received signal strength during the measurement gap and the measurement precludes traffic transmission and reception by components of the UE that are to be used for the measurement; and
   prioritizing the latency-sensitive traffic by the UE, over performing the measurement of received signal strength during the measurement gap by performing, at the UE, transmission or reception of the latency-sensitive traffic during the measurement gap instead of or in addition to performing the measurement of received signal strength.

2. The method of claim 1, wherein the detecting comprises identifying the latency-sensitive traffic based on one or more of:
   a Radio Network Temporary Identifier (RNTI);
   occurrence of multiple Physical Downlink Control Channel (PDCCH) monitoring occasions in a slot;
   a compact Downlink Control Information (DCI);
   one or more other indication(s) via physical layer signaling.

3. The method of claim 1, wherein the detecting comprises identifying the latency-sensitive traffic based on a logical channel number.

4. The method of claim 1, further comprising:
   performing the measurement only during a remainder of the measurement gap after the transmission or reception of the latency-sensitive traffic is completed.

5. The method of claim 1, wherein the measurement gap comprises a measuring time, and wherein the method further comprises:
   shortening the measuring time.

6. The method of claim 1, wherein the measurement gap comprises a switching time associated with communication resource switching, and wherein the method further comprises:
   configuring communication resources to avoid the communication resource switching.

7. The method of claim 1, wherein the detecting comprises physical layer-based detection.

8. The method of claim 1, wherein the detecting comprises detection based on a logical configuration.

9. The method of claim 1, wherein performing transmission or reception of the latency-sensitive traffic comprises any one or more of:
uplink transmission of the latency-sensitive traffic from the UE during the measurement gap;
downlink reception of the latency-sensitive traffic by the UE during the measurement gap.

10. The method of claim 1, further comprising:
transmitting any one or more of the following during the measurement gap:
periodic, aperiodic, and/or semi-persistent Channel State Information (CSI) reports;
Sounding Reference Signals.

11. A non-transitory processor-readable medium storing instructions which, when executed by one or more processors, cause the one or more processors to perform a method, the method comprising:
detecting arrival or scheduling of latency-sensitive traffic at a user equipment (UE) before a start of a measurement gap that has been configured for the UE, wherein the UE is to perform measurement of received signal strength during the measurement gap and the measurement precludes traffic transmission and reception by components of the UE that are to be used for the measurement; and
prioritizing the latency-sensitive traffic by the UE, over performing the measurement of received signal strength during the measurement gap by performing, at the UE, transmission or reception of the latency-sensitive traffic during the measurement gap has been configured for the UE instead of or in addition to performing the measurement of received signal strength.

12. A user equipment (UE) comprising:
a processor; and
a non-transitory computer readable storage medium storing instructions for execution by the processor, the instructions causing the processor to perform a method comprising:
detecting arrival or scheduling of latency-sensitive traffic before a start of a measurement gap that has been configured for the UE, wherein the UE is to perform measurement of received signal strength during the measurement gap and the measurement precludes traffic transmission and reception by components of the UE that are to be used for the measurement; and
prioritizing the latency-sensitive traffic by the UE, over performing the measurement of received signal strength during the measurement gap by performing transmission or reception of the latency-sensitive traffic during the measurement gap instead of or in addition to performing the measurement of received signal strength.

13. The UE of claim 12, wherein the detecting comprises identifying the latency-sensitive traffic based on one or more of:
a Radio Network Temporary Identifier (RNTI);
occurrence of multiple Physical Downlink Control Channel (PDCCH) monitoring occasions in a slot;
a compact Downlink Control Information (DCI);
one or more other indication(s) via physical layer signaling.

14. The UE of claim 12, wherein the detecting comprises identifying the latency-sensitive traffic based on a logical channel number.

15. The UE of claim 12, wherein the instructions further cause the processor to:
perform the measurement only during a remainder of the measurement gap after the transmission or reception of the latency-sensitive traffic is completed.

16. The UE of claim 12, wherein the measurement gap comprises a measuring time, and wherein the instructions further cause the processor to:
shorten the measuring time.

17. The UE of claim 12, wherein the measurement gap comprises a switching time associated with communication resource switching, and wherein the instructions further cause the processor to:
configure communication resources to avoid the communication resource switching.

18. The UE of claim 12, wherein the detecting comprises physical layer-based detection.

19. The UE of claim 12, wherein the detecting comprises detection based on a logical configuration.

20. The UE of claim 12, wherein the transmission or reception of the latency-sensitive traffic comprises any one or more of:
uplink transmission of the latency-sensitive traffic from the UE during the measurement gap;
downlink reception of the latency-sensitive traffic by the UE during the measurement gap.

21. The UE of claim 12, wherein the instructions further cause the processor to:
transmit any one or more of the following during the measurement gap:
periodic, aperiodic, and/or semi-persistent Channel State Information (CSI) reports;
Sounding Reference Signals.

22. The method of claim 1, wherein performing transmission or reception comprises performing the transmission or reception of the latency-sensitive traffic during the measurement gap instead of performing the measurement.

23. The method of claim 1, wherein performing transmission or reception comprises performing the transmission or reception of the latency-sensitive traffic during the measurement gap instead of performing communication resource switching associated with the measurement gap.

24. The method of claim 1, wherein the prioritizing further comprises delaying communication resource switching associated with the measurement gap until completion of the transmission or reception.

25. The method of claim 1, further comprising:
sending, by the UE before the start of the measurement gap, a Scheduling Request (SR) associated with the latency-sensitive traffic,
wherein the prioritizing further comprises monitoring and receiving, by the UE, an uplink grant during the measurement gap,
wherein the transmission or reception of the latency-sensitive traffic comprises uplink transmission of the latency-sensitive traffic during the measurement gap.

26. The method of claim 1, wherein the latency-sensitive traffic comprises uplink data, the method further comprising:
starting, by the UE, sending the uplink data before the start of the measurement gap,
wherein the transmission or reception of the latency-sensitive traffic comprises continuing uplink transmission of the uplink data during the measurement gap.

27. The method of claim 1, wherein the latency-sensitive traffic comprises downlink traffic, the method further comprising:
   prioritizing, over performing the measurement of received signal strength during the measurement gap, a Hybrid Automatic Repeat reQuest (HARQ) acknowledgement that corresponds to the downlink traffic, by transmitting the HARQ acknowledgement during the measurement gap.

28. The method of claim 1, wherein the latency-sensitive traffic comprises traffic received by the UE, the method further comprising:
   prioritizing, over performing the measurement of received signal strength during the measurement gap, an aperiodic Channel State Information (CSI) request that corresponds to the traffic, by transmitting the aperiodic CSI request during the measurement gap.

29. The method of claim 1, wherein the latency-sensitive traffic comprises downlink traffic that is scheduled before the measurement gap, wherein the transmission or reception of the latency-sensitive traffic comprises reception of a downlink transmission during the measurement gap instead of or in addition to performing the measurement of received signal strength.

* * * * *